(12) United States Patent
Skarve et al.

(10) Patent No.: US 10,484,258 B2
(45) Date of Patent: Nov. 19, 2019

(54) OUT OF SEQUENCE DELIVERY OF AN SDU IN A RADIO DEVICE

(71) Applicant: Telefonaktiebolaget LM Ericsson (publ), Stockholm (SE)

(72) Inventors: Martin Skarve, Enebyberg (SE); Mattias Åkervik, Kista (SE); Martin Andersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/533,969

(22) PCT Filed: Dec. 12, 2014

(86) PCT No.: PCT/SE2014/051492
§ 371 (c)(1),
(2) Date: Jun. 7, 2017

(87) PCT Pub. No.: WO2016/093756
PCT Pub. Date: Jun. 16, 2016

(65) Prior Publication Data
US 2017/0331713 A1     Nov. 16, 2017

(51) Int. Cl.
*H04L 1/18*      (2006.01)
*H04L 12/26*     (2006.01)
(Continued)

(52) U.S. Cl.
CPC ........ *H04L 43/0829* (2013.01); *H04L 1/0078* (2013.01); *H04L 1/1819* (2013.01);
(Continued)

(58) Field of Classification Search
USPC .......................................... 714/748, 750, 751
See application file for complete search history.

(56) References Cited

U.S. PATENT DOCUMENTS

| | | | | |
|---|---|---|---|---|
| 6,021,134 A | * | 2/2000 | Hiraiwa | H04Q 11/0478 370/395.61 |
| 6,912,230 B1 | * | 6/2005 | Salkini | H04B 7/18563 370/466 |

(Continued)

FOREIGN PATENT DOCUMENTS

| EP | 2117278 A1 | 11/2009 |
|---|---|---|
| WO | 2011077184 A1 | 6/2011 |

OTHER PUBLICATIONS

International Search Report and Written Opinion for International Patent Application No. PCT/SE2014/051492, dated Aug. 11, 2015, 9 pages.
(Continued)

*Primary Examiner* — Fritz Alphonse
(74) *Attorney, Agent, or Firm* — Withrow & Terranova, PLLC

(57) ABSTRACT

The present disclosure relates receiving a plurality of Protocol Data Units (PDU) of a PDU sequence over a radio interface; detecting that a PDU of the sequence of the received PDUs is missing, wherein for each of the received PDUs, identifying which Service Data Unit(s) (SDU) it relates to; based on said identifying, determining that a complete SDU is obtainable from one or several PDUs of the received PDUs, which one or several PDUs are later in the sequence of the received PDUs than the missing PDU; obtaining the complete SDU from said one or several PDUs; performing a packet inspection of the obtained complete SDU to determine the type of data it carries; and based on the performed packet inspection, determining that the complete SDU fulfils a predetermined criterion; and delivering the complete SDU before receiving a retransmission of the PDU which is missing.

13 Claims, 4 Drawing Sheets

(51) Int. Cl.
*H04L 1/00* (2006.01)
*H04L 29/08* (2006.01)
*H04W 76/27* (2018.01)

(52) U.S. Cl.
CPC .......... *H04L 1/1841* (2013.01); *H04L 69/321* (2013.01); *H04L 69/322* (2013.01); *H04W 76/27* (2018.02)

(56) References Cited

U.S. PATENT DOCUMENTS

| | | | |
|---|---|---|---|
| 2008/0170531 A1* | 7/2008 | Petry | H04L 65/601 370/312 |
| 2009/0177941 A1* | 7/2009 | Wager | H04L 1/0061 714/752 |
| 2012/0230180 A1* | 9/2012 | Miettnen | H04L 1/1809 370/216 |
| 2012/0294281 A1 | 11/2012 | Park | |
| 2015/0195271 A1* | 7/2015 | Yu | H04L 63/00 726/9 |

OTHER PUBLICATIONS

Examination Report for European Patent Application No. 14821882.9, dated Oct. 5, 2018, 5 pages.

* cited by examiner

OUT OF SEQUENCE DELIVERY OF AN SDU IN A RADIO DEVICE

This application is a 35 U.S.C. § 371 national phase filing of International Application No. PCT/SE2014/051492, filed Dec. 12, 2014, the disclosure of which is incorporated herein by reference in its entirety.

TECHNICAL FIELD

The present disclosure relates to methods and devices for acting upon a missing Protocol Data Unit (PDU) of a received PDU sequence in a radio device.

BACKGROUND

Both the Long Term Evolution (LTE) and Wideband Code Division Multiple Access (WCDMA) radio communication standards use persistent protocols, where Radio Link Control (RLC) is the key protocol to secure that all Service Data Units (SDUs) are correctly delivered and in the correct order (in-sequence-delivery). RLC, among other protocols, includes a retransmission functionality to support this. To be able to fulfil in-sequence-delivery requirements, any lost RLC Protocol Data Unit (PDU) must be retransmitted. Meanwhile on the receiver side, there is no data delivered from the RLC layer to higher layers until the lost PDU is correctly received. A rough estimation gives 0.5% RLC retransmission rate for Enhanced Uplink (EUL), 2 & 10 milliseconds (ms), and even higher for R99 uplink (R99 is the standard defined in the Third Generation Partnership Project (3GPP) Release '99, the original Universal Mobile Telecommunications System (UMTS) release).

Later trends have been towards the direction of increased Hybrid Automatic Repeat Request (hybrid ARQ or HARQ) failure rate and RLC Block Error Rate (BLER) to improve the cell capacity of cellular communication networks.

FIG. 1 illustrates the transmission, in accordance with prior art, of two higher layer SDUs, $1^{st}$ SDU and $2^{nd}$ SDU, from a User Equipment (UE) to a service provider via a Radio Access Network (RAN) node. The $1^{st}$ SDU and the $2^{nd}$ SDU are segmented into a $1^{st}$ PDU and a $2^{nd}$ PDU, respectively (here for simplification assuming that there is a 1:1 relationship between PDUs and SDUs). The RAN node could e.g. be a Radio Network Controller (RNC) or an Evolved Node B (eNB). The $2^{nd}$ SDU contains data which is insensitive to out-of-sequence delivery. The $1^{st}$ PDU and the $2^{nd}$ PDU are transmitted from the UE. The RAN node receives the $2^{nd}$ PDU and detects that the $1^{st}$ PDU is missing (there is a gap in the PDU sequence). The RAN node thus requests retransmission of the $1^{st}$ PDU. When the RAN node has successfully received the 1st PDU, the $1^{st}$ SDU and the $2^{nd}$ SDU are sent to the service provider.

Network nodes (for example routers, switches, RNC, Radio Base Station (RBS) e.g. eNB, "sub-nodes" etc.) have buffers to handle data bursts without packet loss. The buffers are dimensioned based on performance, memory, design competence etc. This means that especially older versions of nodes like routers and RNC may have a somewhat poor buffer dimensioning in some scenarios. Poor buffer dimensioning leads to packet loss for larger bursts. The packet losses from bursts cause Transmission Control Protocol (TCP) congestion control to back-off, and this eventually leads to reduced end user performance.

A problem is that an RLC retransmission will cause an outage/delay in the data transfer to the end point (e.g. a higher layer or another node).

Another problem is that when the lost RLC PDU is correctly received, all correctly and in-sequence-delivered PDUs can be delivered to higher layers (in the form of derived SDUs). This will create a larger burst of data, which can be a problem for other nodes to handle correctly without packet loss. This is especially a problem when TCP ACKs are transmitted on the affected (RLC retransmission) link. The reason is that TCP ACKs when received at the server will result in a TCP DATA transmission from the server as long as the server has more data to send. Normally the TCP DATA burst volume is ~70 times larger in size than the TCP ACK burst volume, but for higher rates it has been seen TCP DATA bursts >1000 times than the TCP ACK bursts. The problem also increases with the increased line rates (e.g. when Iu and Iub support is increased from 1 Gbps to 10 Gbps).

For example, an RLC retransmission in WCDMA may take 200 ms. For a dual carrier capable connection this could mean that a corresponding TCP data burst can be up to 1 MB of data. This is a problem for many nodes to handle without packet loss.

SUMMARY

It is an objective of the present disclosure to at least alleviate the above-mentioned problems of the prior art.

According to an aspect of the present disclosure, there is provided a method performed by a radio device. The method comprises receiving a plurality of Protocol Data Units (PDUs) of a PDU sequence over a radio interface. The method also comprises detecting that a PDU of the sequence of the received PDUs is missing. The method also comprises, for each of the received PDUs, identifying which Service Data Unit(s) (SDU) it relates to. The method also comprises, based on said identifying, determining that a complete SDU is obtainable from one or several PDUs of the received PDUs, which one or several PDUs are later in the sequence of the received PDUs than the missing PDU. The method also comprises obtaining the complete SDU from said one or several PDUs. The method also comprises performing a packet inspection of the obtained complete SDU to determine the type of data it carries. The method also comprises, based on the performed packet inspection, determining that the complete SDU fulfils a predetermined criterion. The method also comprises delivering the complete SDU which fulfils the predetermined criterion to a higher layer in the radio device, before receiving a retransmission of the PDU which is missing.

According to another aspect of the present disclosure, there is provided a radio device comprising processor circuitry, and a storage unit storing instructions executable by said processor circuitry whereby said radio device is operative to receive a plurality of PDUs of a PDU sequence over a radio interface. The radio device is also operative to detect that a PDU of the sequence of the received PDUs is missing. The radio device is also operative to, for each of the received PDUs, identify which SDU it relates to. The radio device is also operative to, based on said identifying, determine that a complete SDU is obtainable from one or several PDUs of the received PDUs, which one or several PDUs are later in the sequence of the received PDUs than the missing PDU. The radio device is also operative to obtain the complete SDU from said one or several PDUs. The radio device is also operative to perform a packet inspection of the obtained complete SDU to determine the type of data it carries. The radio device is also operative to, based on the performed packet inspection, determine that the complete SDU fulfils a predetermined criterion. The radio device is also operative to deliver the complete SDU which fulfils the predetermined criterion to a higher layer in the radio device, before receiving a retransmission of the PDU which was not properly received.

According to another aspect of the present disclosure, there is provided a computer program product comprising computer-executable components for causing a radio device to perform an embodiment of the method of the present disclosure when the computer-executable components are run on processor circuitry comprised in the radio device.

According to another aspect of the present disclosure, there is provided a computer program comprising computer program code which is able to, when run on processor circuitry of a radio device, cause the radio device to receive a plurality of PDUs of a PDU sequence over a radio interface. The code is also able to cause the radio device to detect that a PDU of the sequence of the received PDUs is missing. The code is also able to cause the radio device to, for each of the received PDUs, identify which SDU it relates to. The code is also able to cause the radio device to, based on said identifying, determine that a complete SDU is obtainable from one or several PDUs of the received PDUs, which one or several PDUs are later in the sequence of the received PDUs than the missing PDU. The code is also able to cause the radio device to obtain the complete SDU from said one or several PDUs. The code is also able to cause the radio device to perform a packet inspection of the obtained complete SDU to determine the type of data it carries. The code is also able to cause the radio device to, based on the performed packet inspection, determine that the complete SDU fulfils a predetermined criterion. The code is also able to cause the radio device to deliver the complete SDU which fulfils the predetermined criterion to a higher layer in the radio device, before receiving a retransmission of the PDU which was not properly received.

According to another aspect of the present disclosure, there is provided a computer program product comprising an embodiment of a computer program of the present disclosure and a computer readable means on which the computer program is stored.

By determining that a complete SDU is obtainable from PDU(s) later in the PDU sequence than the missing PDU, it is made possible to deliver said SDU without having to wait for the retransmission of the missing PDU, provided that the SDU is not sensitive to out-of-sequence delivery. Thus, the outage in SDU delivery may be reduced and the burst size after the retransmission of the missing PDU may be reduced.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 2:
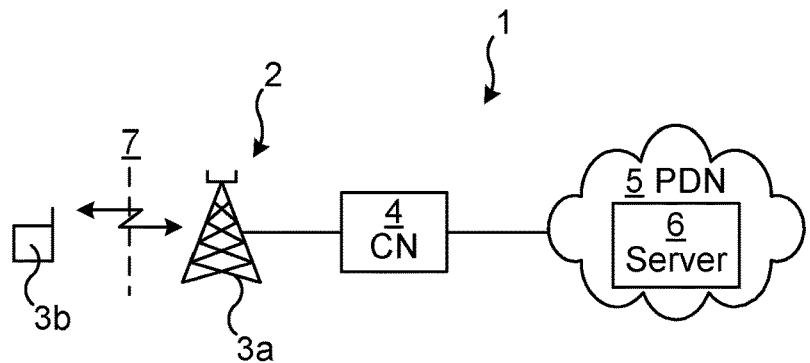
FIG. 2 is a schematic overview of an embodiment of a radio communication network in accordance with the present disclosure.

FIG. 2 is a schematic illustration of a cellular radio communication network 1, which may e.g. be in accordance with an LTE or WCDMA communication standard. The communication network comprises RAN 2 which comprises a plurality of base stations serving a plurality of cells. FIG. 2 is simplified and only shows one base station 3a, e.g. a Node B or eNB. If the communication network is in accordance with WCDMA, the RAN 2 also comprises at least one RNC. The base station 3a is configured for radio communication with one or more radio terminal(s) 3b, e.g. a UE, over a radio interface 7. The communication network 1 also comprises a core network (CN) 4 by means of which the RAN 2 node 3a and the radio terminal 3b is able to connect to a packet data network (PDN) 5, e.g. the Internet, e.g. to a server 6 which may for instance provide a service to the radio terminal 3b. It should be noted that embodiments of the present disclosure are not all limited to the context of a cellular radio communication network 1, but may relate to any radio device 3, e.g. a radio terminal 3b or a RAN node 3a such as a base station e.g. Node B or eNB, or other RAN node such as an RNC, which is on the receiving side of a radio communication.

Figure 3:
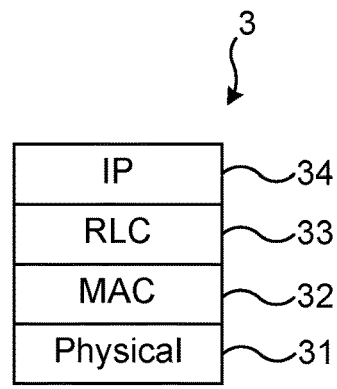
FIG. 3 is a schematic illustration of an embodiment of a part of a protocol stack in a radio device, in accordance with the present disclosure.

FIG. 3 illustrates part of a protocol stack in a radio device 3. Embodiments of the method of the present disclosure are performed in the RLC layer 33 where PDUs sent from a corresponding RLC layer 33 of another radio device 3 are received in a PDU sequence. The PDUs carry data which are extracted to SDUs which are delivered to higher layers, illustrated with the Internet Protocol layer 34 in FIG. 3. In these higher layers, data is typically transmitted in accordance with IP, in contrast with the protocols used for radio communication over the air interface. The RLC layer 33 is above the Media Access Control (MAC) layer 32 which in its turn is above the physical layer 31.

Figure 4:
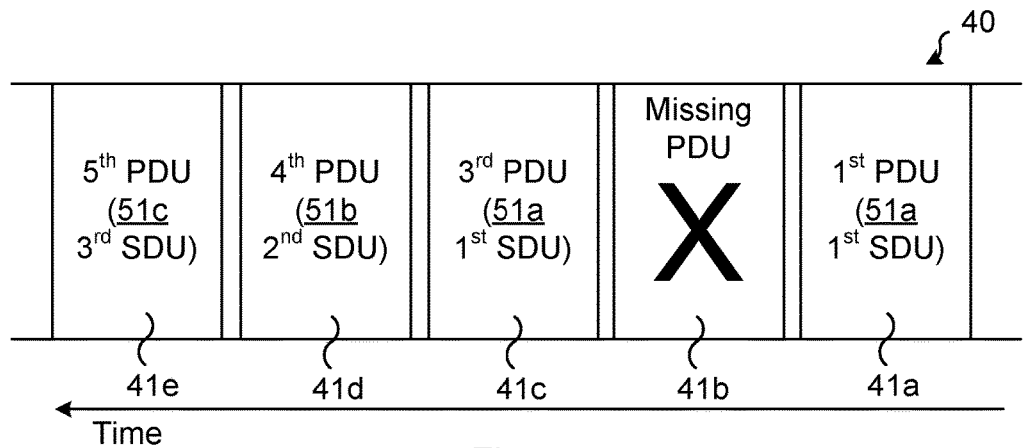
FIG. 4 is a schematic block diagram of an embodiment of a PDU sequence, in accordance with the present disclosure.

FIG. 4 illustrates a PDU sequence 4o comprising a plurality of PDUs 41 in sequence. Each PDU typically comprises a header with a sequence number or other identifier by means of which the radio device 3 receiving the PDU sequence 40 can determine whether it receives all the PDUs in the PDU sequence, or whether there are gaps in the sequence indicating that there is one or more missing PDU(s). In the embodiment of FIG. 4, five PDUs 41 are part of the received sequence 40, a $1^{st}$ PDU 41a, a $2^{nd}$ PDU 41b, a $3^{rd}$ PDU 41c, a $4^{th}$ PDU 41d and a $5^{th}$ PDU die. These PDUs may e.g. have been received in the same burst from another radio device. In this embodiment, the $2^{nd}$ PDU 41b is missing. That a PDU is missing may be because it has not been at all received by the radio device 3, or because it has been only partly or otherwise incorrectly received by the radio device 3. The radio device may e.g. note that the PDU 41b is missing when it inspects the header of the $3^{rd}$ PDU 41c and notes that there is a gap in the sequence 40 between the $3^{rd}$ PDU 41c and the $1^{st}$ PDU 41a. According to prior art, the radio device would now request retransmission of the missing/$2^{nd}$ PDU 41b and would not proceed with inspecting the following PDUs in the sequence until the $2^{nd}$ (missing) PDU had been retransmitted and properly received. However, in accordance with the present disclosure, the radio device 3 will proceed with inspecting/processing the PDUs which are following the missing PDU 41b.

Each PDU 41 of the sequence 4o relates to (i.e. carries data for) one or more SDUs 51. Depending on the size of the SDUs, a PDU may carry data for more than one SDU or several PDUs may be needed for carrying the data of a single SDU 51, or there may be a 1:1 relationship as in the background example of FIG. 1 and the embodiment of FIG. 5 (below).

In accordance with the present disclosure, the radio device 3 identifies which SDU(s) 51 each PDU 41 relates to. This may typically be indicated in the PDU headers. In the embodiment of FIG. 4, both the $1^{st}$ PDU 41a and the $3^{rd}$ PDU 41c carry data for the $1^{st}$ SDU 51a. Thus, the radio device 3 may conclude that the missing PDU 41b also carries data for the $1^{st}$ SDU 51a, and specifically does not carry data for the $2^{nd}$ SDU 51b. The $4^{th}$ PDU 41d carries data for the $2^{nd}$ SDU 51b and the $5^{th}$ PDU 41e carries data for the $3^{rd}$ SDU 51c. The radio device then knows that it has properly received all the data of the $2^{nd}$ SDU 51b since it has received both the start and end points of the $2^{nd}$ SDU 51b data, since the SDU data is transmitted in sequence within the PDU sequence 40. This would also have been true if parts of the data of the $2^{nd}$ SDU 51b were transmitted in the $3^{rd}$ PDU 41c and/or in the $5^{th}$ PDU 41e, as long as the endpoints of the $2^{nd}$ SDU data are known and all data there between have been properly received. In accordance with the present disclosure, the radio device 3 may thus extract the $2^{nd}$ SDU data and form the $2^{nd}$ SDU for delivery to higher layers (e.g. the IP layer 34) provided that the SDU fulfils a predetermined criterion such that it is not sensitive to out-of-sequence delivery (i.e. it is ok to deliver it before the $1^{st}$ SDU 51a).

Figure 1:
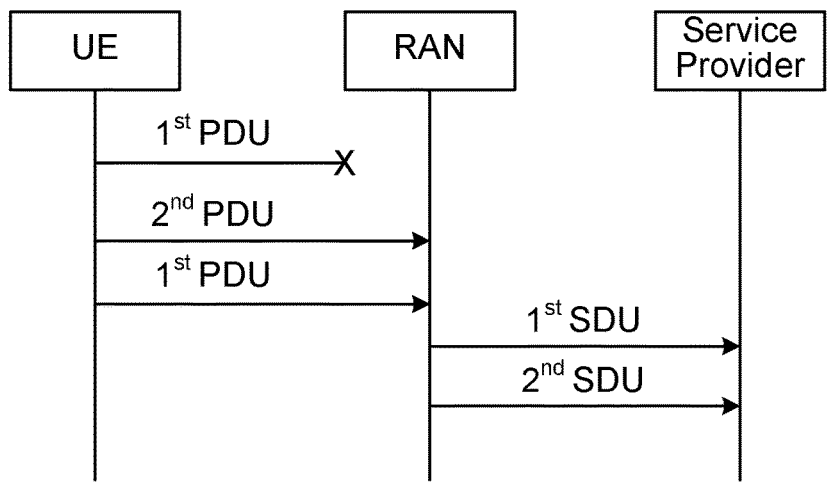
FIG. 1 is a schematic signalling diagram of embodiments of a method according to the prior art.
Figure 5:
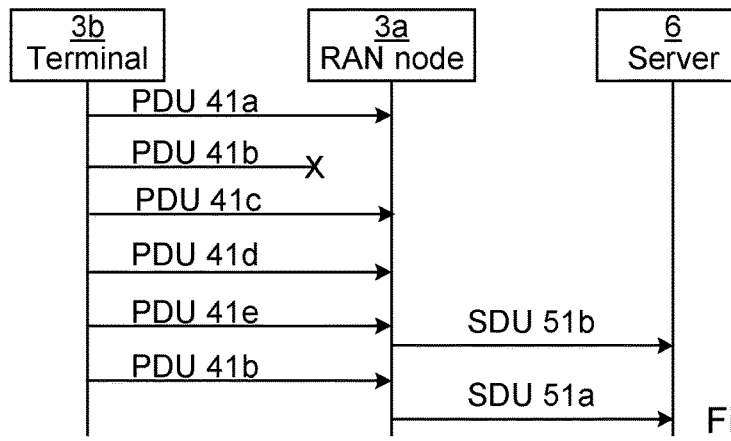
FIG. 5 is a schematic signalling diagram of embodiments of a method in accordance with the present disclosure.

FIG. 5 is a schematic signalling diagram illustrating an embodiment of out-of-sequence delivery in accordance with the present disclosure, in contrast to the signalling illustrated in the background example of FIG. 1. The figure illustrates the transmission of two higher layer SDUs 51, the $1^{st}$ SDU 51a and the $2^{nd}$ SDU 51b, from a radio terminal 3b to a server 6 of a service provider via a RAN node 3a. The $1^{st}$ SDU is segmented into the $1^{st}$, $2^{nd}$ and $3^{rd}$ PDUs 41a-c and the $2^{nd}$ SDU 51b is fully contained in the $4^{th}$ PDU 41d (cf. FIG. 4). The RAN node 3a implements an embodiment of the method of the present disclosure and may e.g. be an RNC or an eNB. The $2^{nd}$ SDU 51b contains data which is insensitive to out-of-sequence delivery. The $1^{st}$ to $5^{th}$ PDUs 41a-e are transmitted from the terminal 3b. The RAN node receives the $1^{st}$, $3^{rd}$, $4^{th}$ and $5^{th}$ PDUs and detects that the $2^{nd}$ PDU 41b is missing. The RAN node 3a identifies the complete $2^{nd}$ SDU 51b contained in the $4^{th}$ PDU 41d as data insensitive to out-of-sequence delivery and forwards the $2^{nd}$ SDU to the server 6. When the RAN node 3a has successfully received the retransmitted $2^{nd}$ PDU 41b, the $1^{st}$ SDU 51a is also sent to the server 6. The service performance gain received in this scenario may be measured as the time between the $2^{nd}$ SDU has been received at the server 6 in accordance with FIG. 5 and the time the $2^{nd}$ SDU has been received at the service provider in accordance with FIG. 1. As pointed out earlier, a more continuous delivery of e.g. TCP acknowledgements (ACKs), as an example of out-of-sequence insensitive SDU 51, may have the effect that transmission bursts are reduced and reduced are also the risk for packet losses and reduced end user performance.

Figure 6A:
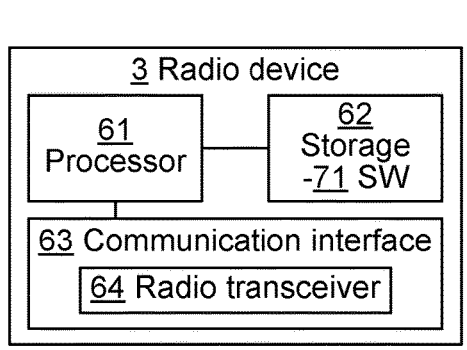
FIG. 6a is a schematic block diagram of an embodiment of a radio device in accordance with the present disclosure.

FIG. 6a schematically illustrates an embodiment of a radio device 3 of the present disclosure, e.g. a radio terminal 3b or a RAN node 3a as discussed in relation to FIG. 2. The radio device 3 comprises processor circuitry 61 e.g. a central processing unit (CPU). The processor circuitry 61 may comprise one or a plurality of processing units in the form of microprocessor(s). However, other suitable devices with computing capabilities could be comprised in the processor circuitry 61, e.g. an application specific integrated circuit (ASIC), a field programmable gate array (FPGA) or a complex programmable logic device (CPLD). The processor circuitry 61 is configured to run one or several computer program(s) or software (SW) 71 (see also FIG. 7) stored in a storage 62 of one or several storage unit(s) e.g. a memory. The storage unit is regarded as a computer readable means 72 (see figure 7) as discussed herein and may e.g. be in the form of a Random Access Memory (RAM), a Flash memory or other solid state memory, or a hard disk, or be a combination thereof. The processor circuitry 61 may also be configured to store data in the storage 62, as needed. The radio device 3 also comprises a communication interface 63 for communication with other nodes in the network 1. The communication interface comprises a radio transceiver 64 for radio communication with other radio devices 3. The radio transceiver 64 comprises transmitter functionality as well as receiver functionality and is associated with an antenna for transmitting and receiving radio signals.

According to an aspect of the present disclosure, there is provided a radio device 3 comprising processor circuitry 61, and a storage unit 62 storing instructions 71 executable by said processor circuitry 61 whereby said radio device 3 is operative to receive a plurality of PDUs 41 of a PDU sequence 40 over a radio interface. The radio device 3 is also operative to detect that a PDU 41b of the sequence 40 of the received PDUs 41 is missing. The radio device 3 is also operative to, for each of the received PDUs 41, identify which SDU 51 it relates to. The radio device 3 is also operative to, based on said identifying, determine that a complete SDU 51b is obtainable from one or several PDUs 41 of the received PDUs, which one or several PDUs are later in the sequence 40 of the received PDUs than the missing PDU 41b. The radio device 3 is also operative to obtain the complete SDU 51b from said one or several PDUs 41. The radio device 3 is also operative to perform a packet inspection of the obtained complete SDU 51b to determine the type of data it carries. The radio device 3 is also operative to, based on the performed packet inspection, determine that the complete SDU 51b fulfils a predetermined criterion. The radio device 3 is also operative to deliver the complete SDU 51b which fulfils the predetermined criterion to a higher layer 34 in the radio device 3, before receiving a retransmission of the PDU 41b which was not properly received.

Figure 6B:
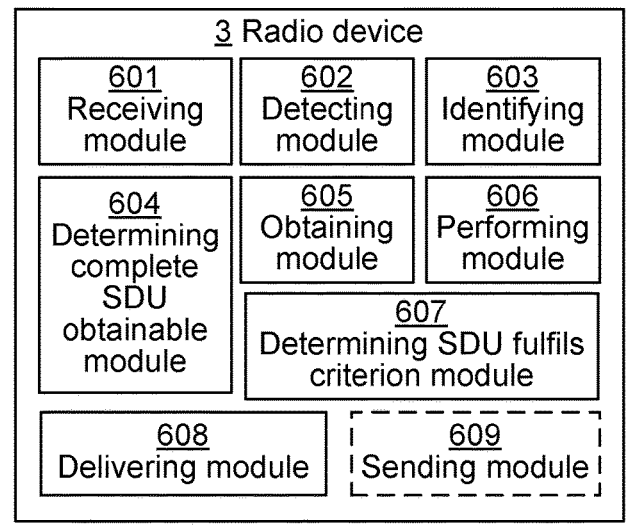
FIG. 6b is a schematic functional block diagram of an embodiment of the radio device in accordance with the present disclosure.

FIG. 6b is a schematic block diagram functionally illustrating an embodiment of the radio device 3 in FIG. 6a. As previously mentioned, the processor circuitry 61 may run software 71 for enabling the radio device 3 to perform an embodiment of a method of the present disclosure, whereby functional modules may be formed in the radio device 3 e.g. in the processor circuitry 61 for performing the different steps of the method. These modules are schematically illustrated as blocks within the radio device 3. Thus, the radio device 3 comprises a receiving module 601 for receiving a plurality of PDUs 41 of a PDU sequence 40 over a radio interface. The radio device 3 also comprises a detecting module 602 for detecting that a PDU 41b of the sequence 40 of the received PDUs 41 is missing. The radio device 3 also comprises an identifying module 603 for, for each of the received PDUs, identifying which SDU 51 it relates to. The radio device 3 also comprises a determining complete SDU is obtainable module 604 for, based on said identifying, determining that a complete SDU 51b is obtainable from one or several PDUs 41 of the received PDUs, which one or several PDUs are later in the sequence 40 of the received PDUs than the missing PDU 41b. The radio device 3 also comprises an obtaining module 605 for obtaining the complete SDU 51b from said one or several PDUs 41. The radio device 3 also comprises a performing module 606 for performing a packet inspection of the obtained complete SDU 51b to determine the type of data it carries. The radio device 3 also comprises a determining SDU fulfils criterion module 607 for, based on the performed packet inspection, determining that the complete SDU 51b fulfils a predetermined criterion. The radio device 3 also comprises a delivering module 608 for delivering the complete SDU 51b which fulfils the predetermined criterion to a higher layer 34 in the radio device 3, before receiving a retransmission of the PDU 41b which is missing. In some embodiments, the radio device 3 also comprises a sending module 609 for sending the complete SDU 51b to a network server 6, e.g. a service provider.

Thus, according to an aspect of the present disclosure, there is provided a radio device 3. The radio device 3 comprises means 601 for receiving a plurality of PDUs 41 of a PDU sequence 40 over a radio interface. The radio device 3 also comprises means 602 for detecting that a PDU 41b of the sequence 40 of the received PDUs 41 is missing. The radio device 3 also comprises means 603 for, for each of the received PDUs, identifying which SDU 51 it relates to. The radio device 3 also comprises means 604 for, based on said identifying, determining that a complete SDU 51b is obtainable from one or several PDUs 41 of the received PDUs, which one or several PDUs are later in the sequence 40 of the received PDUs than the missing PDU 41b. The radio device 3 also comprises means 605 for obtaining the complete SDU 51b from said one or several PDUs 41. The radio device 3 also comprises means 606 for performing a packet inspection of the obtained complete SDU 51b to determine the type of data it carries. The radio device 3 also comprises means 607 for, based on the performed packet inspection, determining that the complete SDU 51b fulfils a predetermined criterion. The radio device 3 also comprises means 608 for delivering the complete SDU 51b which fulfils the predetermined criterion to a higher layer 34 in the radio device 3, before receiving a retransmission of the PDU 41b which is missing. In some embodiments, the radio device 3 also comprises means 609 for sending the complete SDU 51b to a network server 6, e.g. a service provider.

Figure 7:
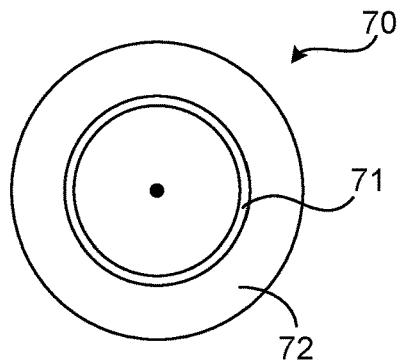
FIG. 7 is a schematic illustration of an embodiment of a computer program product in accordance with the present disclosure.

FIG. 7 illustrates a computer program product 70. The computer program product 70 comprises a computer readable medium 72 comprising a computer program 71 in the form of computer-executable components 71. The computer program/computer-executable components 71 may be configured to cause a radio device 3, e.g. as discussed herein, to perform an embodiment of the method of the present disclosure. The computer program/computer-executable components may be run on the processor circuitry 61 of the radio device 3 for causing the radio device to perform the method. The computer program product 70 may e.g. be comprised in a storage unit or memory 62 comprised in the radio device 3 and associated with the processor circuitry 61. Alternatively, the computer program product 70 maybe, or be part of, a separate, e.g. mobile, storage means, such as a computer readable disc, e.g. CD or DVD or hard disc/drive, or a solid state storage medium, e.g. a RAM or Flash memory.

Figure 8A:
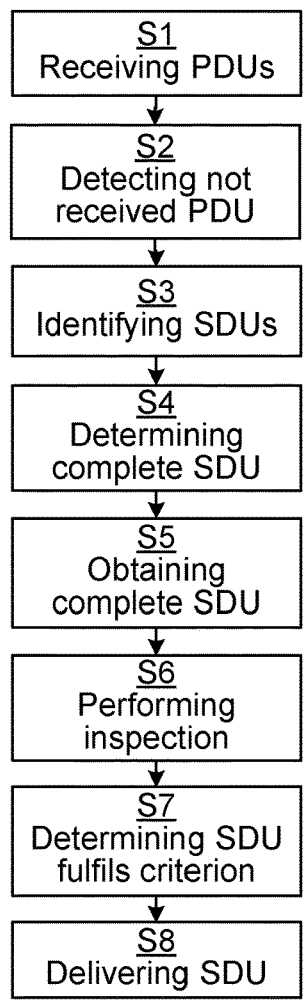
FIG. 8a is a schematic flow chart of an embodiment of a method in accordance with the present disclosure.

FIG. 8a is a schematic flow chart of an embodiment of a method of the present disclosure. The method is performed by a radio device 3 of the present disclosure, e.g. a radio terminal 3b or a RAN node 3a as discussed in relation to FIG. 2. The radio device 3 receives S1 a plurality of PDUs 41 of a PDU sequence 40 over a radio interface, e.g. as discussed in relation to FIG. 4. Any number of PDUs of the sequence 40 may be received, each comprising an identifier such as a sequence number or the like, allowing its place in the sequence 40 to be determined. Then, the radio device 3 detects S2 that a PDU 41b of the sequence 40 of the received S1 PDUs 41 is missing, typically by means of reading said identifiers of the received PDUs 41. Any number of PDU(s) may be missing. For instance, a plurality of sequential (adjacent) PDUs may be missing. Any one missing PDU (if there are more than one missing PDU) may be the missing PDU discussed herein. For each of the received S1 PDUs, the radio device 3 identifies S3 which SDU 51 it relates to, i.e. which one or more SDU(s) the data carried by each PDU relates to. Based on said identifying S3, the radio device 3 determines S4 that a complete SDU 51b is obtainable from one or several PDUs 41 of the received S1 PDUs, which one or several PDUs are later in the sequence 40 of the received PDUs than the missing PDU 41b. Then, the radio device 3 obtains S5 the complete SDU 51b from said one or several PDUs 41. This is to allow the radio device 3 to inspect/read the SDU 51b. The obtaining S5 may e.g. comprising decryption of the one or several PDUs 41 carrying the data of the complete SDU 51b if the data is sent encrypted, which is often the case. Then, the radio device 3 performs S6 a packet inspection of the obtained S5 complete SDU 51b to determine the type of data it carries. The radio device 3 may e.g. determine whether the data is User Datagram Protocol (UDP) data, which typically is not sensitive to out-of-sequence delivery, or TCP data which may or may not be sensitive to out-of-sequence delivery. Based on the performed S6 packet inspection, the radio device 3 determines S7 that the complete SDU 51*b* fulfils a predetermined criterion. The criterion may e.g. be that the data is not sensitive to out-of-sequence delivery. The radio device 3 may e.g. have a predefined list of data types which it should regard as fulfilling the criterion e.g. because they are not sensitive to out-of-sequence delivery. Then, the radio device 3 delivers S8 the complete SDU 51*b* which fulfils the predetermined criterion to a higher layer 34 in the radio device 3, before receiving a retransmission of the PDU 41*b* which is missing. Thereby, the radio device 3 performs an out-of-sequence delivery of an SDU 51 which has been determined to be suitable for out-of-sequence delivery. The SDU with data held by the missing PDU will likely be delivered later after retransmission.

Figure 8B:
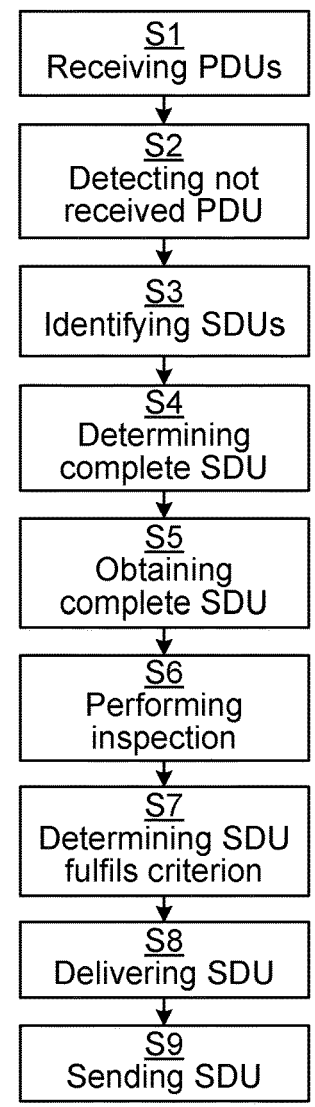
FIG. 8b is a schematic flow chart of another embodiment of a method in accordance with the present disclosure.

FIG. 8*b* is a schematic flow chart of another embodiment of a method of the present disclosure. The steps of receiving S1 PDUs, detecting S2 not received PDUs, identifying S3 SDUs, determining S4 that there is a complete SDU, obtaining S5 complete SDU, performing S6 inspection, determining S7 that the complete SDU fulfils the criterion, and delivering S8 the complete SDU, are as discussed in relation to FIG. 8*a*. In addition, in some embodiments of the present disclosure, the radio device 3 also sends S9 the delivered S8 complete SDU 51*b* to a network server 6, e.g. a service provider. The out-of-sequence SDU is thus not only transmitted internally to a higher layer within the radio device 3, but also to another network node, e.g. a server 6 of a service provider on the PDN/Internet, possibly also via other nodes in the network 1 and/or the PDN 5.

In some embodiments of the present disclosure, the predefined criterion is (or is such that it is used to determine) that the complete SDU 51*b* contains data which is not sensitive to out-of-sequence delivery. In some embodiments, the predefined criterion is any of that the complete SDU 51*b* contains UDP data, for instance a Domain Name System (DNS) message or a TCP setup message or a TCP ACK message without any user data. The TCP setup message may e.g. be a message with a SYN flag and/or an ACK. If an ACK message also contains user data, then it may be sensitive to out-of-sequence delivery and may not fulfil the criterion. Alternatively, the predefined criterion may be that the complete SDU 51*b* belongs to a TCP connection to which any SDU 51 related to the missing PDU 41*b* does not belong. A radio device may have more than one TCP connection set up, in which case the TCP data of the complete SDU 51*b* may not be out-of-sequence delivery sensitive if it relates to another TCP connection than the data of the missing PDU 41*b*. In this case, also TCP data may thus be ok for out-of-sequence delivery on an SDU level.

In some embodiments of the present disclosure, the step of obtaining S5 the complete SDU 51*b* comprises decrypting data for said complete SDU.

In some embodiments of the present disclosure, the method is performed in a Radio Link Protocol (RLP) layer e.g. the RLC layer 33, in the radio device 3. It is noted that RLC is an example of RLP.

In some embodiments of the present disclosure, the radio device 3 is a RAN 2 node 3*a* e.g. a Node B, an eNB or an RNC, or a radio terminal 3*b* e.g. a UE. These are some examples of radio devices which may benefit from the use of embodiments of the present disclosure. The radio terminal 3*b* may be any device or user equipment (UE), mobile or stationary, enabled to communicate over a radio channel in a communication network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

In some embodiments of the present disclosure, the radio device 3 is part of a cellular radio communication network i in accordance with a 3GPP io communication standard e.g. LTE or WCDMA. However, any type of radio device, e.g. for Device-to-Device (D2D), point-to-point (P2P) e.g. microwave link, or Wireless Local Area Network (WLAN) communication might benefit from the use of embodiments of the present disclosure.

In some embodiments of the present disclosure, the receiving S1 a plurality of PDUs 41 comprises receiving the PDUs from another radio device 3, for instance a radio terminal 3*b* e.g. a UE.

EXAMPLE

Figure 9:
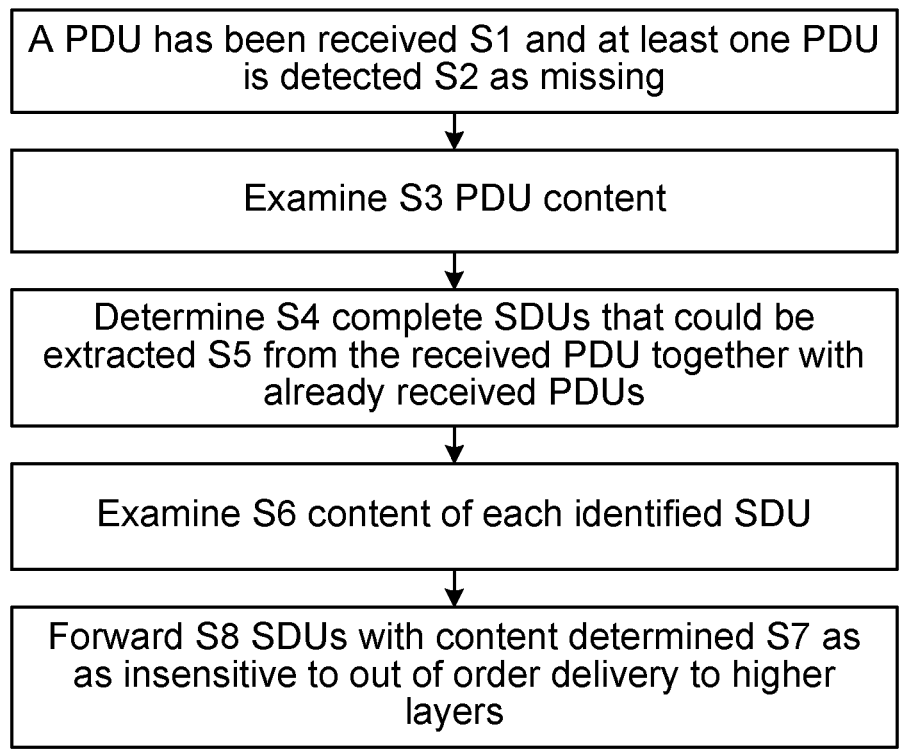
FIG. 9 is a schematic flow chart of an example embodiment of a method in accordance with the present disclosure.

The example applies to when an RLC PDU is lost/missing and an RLC retransmission is required/triggered. The method is of delivering received S1 data to higher layers in a radio device 3 terminating a reliable and ordered transport protocol connection towards another radio device 3. The embodiment is related to how data units are delivered to higher layer after a PDU from the other radio device is detected S2 to be missing. FIG. 9 illustrates the reception Si of a PDU 41 when at least one PDU is detected S2 as missing.

According to the example embodiment, the radio device 3 shall at RLC retransmission:
1) Continuously identify S4 SDUs 51 within all PDUs 41 received S1 but not delivered to higher layers. The Length indicator and Header Extension can be used for this.
2) For SDUs, which are completely and correctly received S1, decrypt S5 the data.
3) Perform S6 shallow packet inspection. This means bit-mapping for certain information such as protocol type (UDP or TCP), Port numbers etc.
4) for SDUs 51 fulfilling predefined rules/criterion, deliver S8 those SDUs 51*b* to higher layers (i.e. out-of-sequence-delivery). Example of such a criterion is data not sensitive to out-of-sequence-delivery, mainly UDP datagrams (e.g. DNS messages) and specific TCP segments (e.g. segments involved in TCP connection establishment SYN/SYNACK or segments not containing any payload/user data). DNS may be identified with port number=53. TCP SYN and TCP ACK are flags in the TCP header that can be easily identified.

This will mean a faster and more continuous delivery of data packets, which will mean improved end user performance. The method may be implemented in an intermediate network node (e.g. a RAN node 3*a*, a router or an eNB) or in a terminal 3*b* (e.g. a computer or a smart phone), as discussed above.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a radio device, the method comprising:
   receiving a plurality of Protocol Data Units, PDUs, of a PDU sequence over a radio interface;
   detecting that a PDU of the sequence of the received PDUs is missing;
   for each of the received PDUs, identifying which Service Data Unit(s), SDU, it relates to;
   based on said identifying, determining that a complete SDU is obtainable from one or several PDUs of the received PDUs, which one or several PDUs are later in the sequence of the received PDUs than the missing PDU;
   obtaining the complete SDU from said one or several PDUs;
   performing a packet inspection of the obtained complete SDU to determine the type of data it carries;
   based on the performed packet inspection, determining that the complete SDU fulfils a predetermined criterion; and
   delivering the complete SDU which fulfils the predetermined criterion to a higher layer in the radio device, before receiving a retransmission of the PDU which is missing.

2. The method of claim 1, wherein the predefined criterion is that the complete SDU contains data which is insensitive to out-of-sequence delivery.

3. The method of claim 2, wherein the predefined criterion is any of:
   the complete SDU contains User Datagram Protocol, UDP, data, for instance a Domain Name System, DNS, message or a Transmission Control Protocol, TCP, setup message or a TCP acknowledgement, ACK, message without any user data; or
   the complete SDU belongs to a TCP connection to which any SDU related to the missing PDU does not belong.

4. The method of claim 1, wherein the step of obtaining the complete SDU comprises decrypting data for said complete SDU.

5. The method of claim 1, wherein the method is performed in a Radio Link Protocol, RLP, layer e.g. the Radio Link Control, RLC, layer, in the radio device.

6. The method of claim 1, wherein the radio device is a Radio Access Network, RAN, node e.g. a Node B, an evolved Node B, eNB, or a Radio Network Control, RNC; or a radio terminal e.g. a user equipment, UE.

7. The method of claim 1, wherein the radio device is part of a cellular radio communication network in accordance with a Third Generation Partnership Program, 3GPP, communication standard e.g. Long Term Evolution, LTE, or Wideband Code Division Multiple Access, WCDMA.

8. The method of claim 1 wherein the receiving a plurality of PDUs comprises receiving the PDUs from another radio device, for instance a radio terminal e.g. a UE.

9. The method of claim 1, further comprising:
   sending the complete SDU to a network server, e.g. a service provider.

10. A radio device comprising:
    processor circuitry; and
    a storage unit storing instructions executable by said processor circuitry whereby said radio device is operative to:
       receive a plurality of Protocol Data Units, PDUs, of a PDU sequence over a radio interface;
       detect that a PDU of the sequence of the received PDUs is missing;
       for each of the received PDUs, identify which Service Data Unit(s), SDU, it relates to;
       based on said identifying, determine that a complete SDU is obtainable from one or several PDUs of the received PDUs, which one or several PDUs are later in the sequence of the received PDUs than the missing PDU;
       obtain the complete SDU from said one or several PDUs;
       perform a packet inspection of the obtained complete SDU to determine the type of data it carries;
       based on the performed packet inspection, determine that the complete SDU fulfils a predetermined criterion; and
       deliver the complete SDU which fulfils the predetermined criterion to a higher layer in the radio device, before receiving a retransmission of the PDU which was not properly received.

11. The radio device of claim 10, wherein the predefined criterion is any of:
    the complete SDU contains User Datagram Protocol, UDP, data, for instance a Domain Name System, DNS, message or a Transmission Control Protocol, TCP, setup message or a TCP acknowledgement, ACK, message without any user data; or
    the complete SDU belongs to a TCP connection to which any SDU related to the missing PDU does not belong.

12. The radio device of claim 10, wherein the radio device is a Radio Access Network, RAN, node e.g. a Node B, an evolved Node B, eNB, or a Radio Network Control, RNC; or a radio terminal e.g. a user equipment, UE.

13. The radio device of claim 10, wherein the radio device is configured for being part of a cellular radio communication network in accordance with a third Generation Partnership Program, 3GPP, communication standard e.g. Long Term Evolution, LTE, or Wideband Code Division Multiple Access, WCDMA.

* * * * *